(12) United States Patent
Sim et al.

(10) Patent No.: US 8,320,340 B2
(45) Date of Patent: Nov. 27, 2012

(54) DISTRIBUTED WIRELESS MEDIUM ACCESS CONTROL PROTOCOL FOR AD-HOC NETWORKS

(75) Inventors: Hong Cheng Michael Sim, Singapore (SG); Poy Boon Tan, Singapore (SG); Hiroshi Doi, Osaka (JP)

(73) Assignee: Panasonic Corporation, Osaka (JP)

( * ) Notice: Subject to any disclaimer, the term of this patent is extended or adjusted under 35 U.S.C. 154(b) by 601 days.

(21) Appl. No.: 12/282,332

(22) PCT Filed: Mar. 15, 2006

(86) PCT No.: PCT/SG2006/000059
§ 371 (c)(1),
(2), (4) Date: Feb. 9, 2009

(87) PCT Pub. No.: WO2007/106042
PCT Pub. Date: Sep. 20, 2007

(65) Prior Publication Data
US 2009/0310573 A1    Dec. 17, 2009

(51) Int. Cl.
*H04J 3/00*    (2006.01)
(52) U.S. Cl. .................. 370/336; 370/458; 709/226
(58) Field of Classification Search .................. None
See application file for complete search history.

(56) References Cited

U.S. PATENT DOCUMENTS

| | | | |
|---|---|---|---|
| 2004/0184481 A1* | 9/2004 | Lee | 370/469 |
| 2005/0128991 A1 | 6/2005 | Dayanandan | |
| 2005/0190731 A1 | 9/2005 | Bejerano | |
| 2005/0249167 A1* | 11/2005 | Salokannel | 370/336 |
| 2005/0249170 A1 | 11/2005 | Salokannel | |
| 2006/0007907 A1* | 1/2006 | Shao et al. | 370/347 |
| 2006/0239220 A1* | 10/2006 | Celentano et al. | 370/328 |
| 2009/0067389 A1* | 3/2009 | Lee et al. | 370/336 |

FOREIGN PATENT DOCUMENTS

| | | |
|---|---|---|
| JP | 2002-281549 | 9/2002 |
| JP | 2005-223767 | 8/2005 |
| JP | 2006-067519 | 3/2009 |
| WO | 2005/076544 | 8/2005 |
| WO | WO 2005076544 A1 * | 8/2005 |
| WO | WO 2005109761 A1 * | 11/2005 |

OTHER PUBLICATIONS

International Search Report dated May 11, 2006.
ECMA-368 Standard 1st Edition, Dec. 2005, pp. i-viii and 1-312.

* cited by examiner

*Primary Examiner* — Yemane Mesfin
*Assistant Examiner* — Khoa Huynh
(74) *Attorney, Agent, or Firm* — Dickinson Wright PLLC

(57) ABSTRACT

A distributed wireless medium access control protocol is disclosed. According to the disclosed wireless medium access control protocol the medium access time is partitioned into equal sized slots, and a predetermined number of the slots forming a superframe. The protocol defines beaconing devices and passive devices. Each beaconing device designates one of the slots in the superframe as its beacon medium access slot, and broadcasts during that beacon medium access slot a beacon frame to other devices in wireless range of that beaconing device. A beacon frame collision detection and resolution procedure, and a procedure for reserving access time for communication between devices are also disclosed.

15 Claims, 19 Drawing Sheets

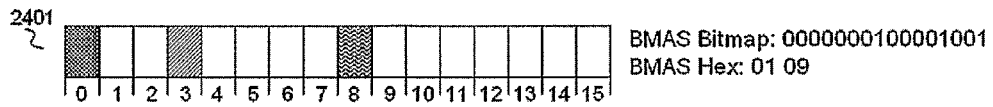
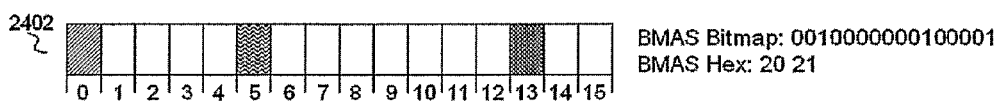
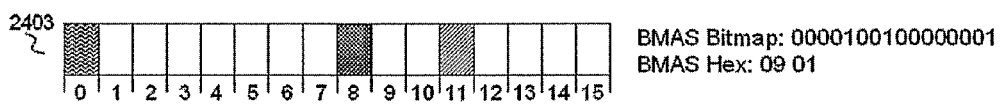
Figure 24
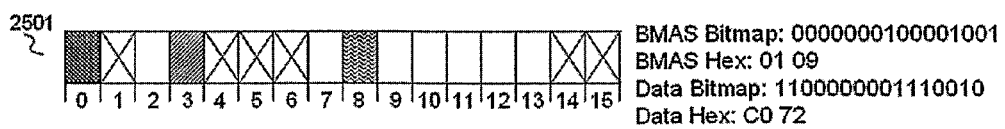
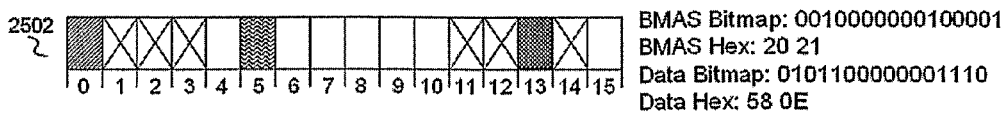
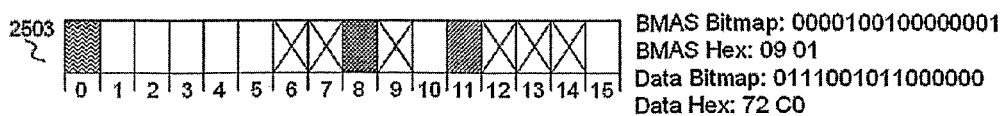
Figure 25

| | ADEV-1 | | | | ADEV-2 | | | | |
|---|---|---|---|---|---|---|---|---|---|
| SF | Beacon Diagram | MAS | CBS | NBS | Beacon Diagram | MAS | CBS | NBS | Status |
| 1 | | 3 | 0 | 1 | | 3 | 0 | 1 | 1. BMAS & Beacon Collision<br>2. Collision detected by PDEV |
| 2 | | 3 | 1 | 0 | | 3 | 1 | 1 | 1. BMAS & Beacon Collision<br>2. PDEV announce collision<br>3. Collision detected by ADEV |
| 3 | | 3 | 0 | 0 | | 3 | 1 | 0 | ADEV announce BMAS change |
| 4 | | 7 | 0 | 1 | | 11 | 0 | 0 | BMAS collision resolved |

Figure 26

| | ADEV-1 | | | | ADEV-2 | | | | |
|---|---|---|---|---|---|---|---|---|---|
| SF | Beacon Diagram | MAS | CBS | NBS | Beacon Diagram | MAS | CBS | NBS | Status |
| 1 | | 3 | 0 | 1 | | 3 | 0 | 1 | 1. BMAS & Beacon Collision<br>2. Collision undetected |
| 2 | | 3 | 1 | 0 | | 3 | 1 | 1 | 1. BMAS & Beacon Collision<br>2. Collision undetected |
| 3 | | 3 | 0 | 0 | | 3 | 1 | 0 | 1. BMAS collision<br>2. Collision detected!<br>3. Announce BMAS change |
| 4 | | 11 | 0 | 1 | | 7 | 0 | 0 | BMAS collision resolved |

Figure 27

| Case# | Data Transfer Scenario | | | | Possibility |
|---|---|---|---|---|---|
| 1 | 2801 ●→ | 2802 ○ | 2803 ○→ | 2804 ◍ | No |
| 2 | 2801 ←● | 2802 ○ | 2803 ○→ | 2804 ◍ | Yes |
| 3 | 2801 ●→ | 2802 ○ | 2803 ○← | 2804 ◍ | No |
| 4 | 2801 ←● | 2802 ○ | 2803 ○← | 2804 ◍ | No |

DISTRIBUTED WIRELESS MEDIUM ACCESS CONTROL PROTOCOL FOR AD-HOC NETWORKS

FIELD OF THE INVENTION

The present invention relates generally to wireless networks and, in particular, to a distributed wireless medium access control protocol for ad-hoc networks.

BACKGROUND

In networks, medium access control enables multiple devices to share the medium for communication. The same applies within a wireless communication medium in which multiple devices form a wireless network. Numerous medium access control strategies for wireless networks exist. Generally, most of those medium access control strategies may be classified into one of the 3 broad categories, namely, Frequency Division Multiple Access (FDMA), Time Division Multiple Access (TDMA) and Code Division Multiple Access (CDMA).

FDMA is a strategies wherein the frequency spectrum is partitioned into frequency channels, and the frequency channels are assigned to users. With FDMA, only one user at any given time is assigned to a particular frequency channel. FIG. 1 illustrates the manner in which FDMA partitions the frequency spectrum into N frequency channels, such as frequencies channels 101, 102 and 103.

In contrast to FDMA, the TDMA strategies partitions the medium access time into time slots. Spectrum capacity is improved by allowing each user to access the entire frequency spectrum for the short period of time. Other users share the same frequencies within the frequency spectrum, but at different time slots. FIG. 2 illustrates the manner in which TDMA partitions the medium access time into N time slots, such as time slots 201, 202 and 203.

CDMA increases spectrum capacity by allowing all users to occupy all frequency channels at the same time. Each user's transmission is assigned a unique code to differentiate that transmission from the other users' transmissions. FIG. 3 illustrates the manner in which CDMA allows users to occupy the entire frequency spectrum all the time, but how different transmissions are allocated different codes, such as codes 301, 302 and 303.

In practical wireless networks some combination of FDMA, TDMA and CDMA is usually used. FDMA and CDMA is usually employed in the Physical (PHY) Layer of the devices in the wireless network, whereas TDMA is usually used in the Medium Access Control (MAC) layer, which is above the PHY layer.

Various TDMA MAC protocols exist. One of the earliest TDMA MAC protocols developed is the Aloha protocol. In the Aloha protocol, any source device wanting to transmit data simply transmits and waits for an acknowledgement from the destination device. If the data was not successfully received due to a collision with another transmission, the source device simply retransmits the data later.

An enhancement to the Aloha protocol is known as the Slotted Aloha protocol. In this protocol the medium access time is divided into fixed interval slots. When a source device wants to transmit, that device transmits at the earliest slot interval and waits for the acknowledgement as in the case of the (normal) Aloha protocol. Again, if the data was not successfully transmitted due to a collision with another transmission, the source device again retransmits the data later. However, in requiring devices to transmit only in slot intervals, transmission collisions are restricted to complete packet collisions only, thereby eliminating partial packet collisions which often occur when the (normal) Aloha protocol is used.

Another MAC layer TDMA protocol is that of the Institute of Electrical and Electronic Engineers (IEEE) Wireless Local Area Network (WLAN) standards 802.11. In the IEEE 802.11 MAC standard, the medium access time is partitioned into a regular time interval, called a Target Beacon Transmission Time (TBTT). FIG. 4 shows the medium access time, and TBTTs 401, 402, 403 and 404. At or following each TBTT a special packet, called a beacon frame, is broadcasted. FIG. 4 also shows the beacon frames, such as beacon frames 441 and 412 transmitted at or following the TBTTs 401 and 402 respectively. It is noted that according the IEEE 802.11 MAC standard uses contention for broadcasting the beacons frames 411 and 412, causing the beacon frames to be delayed if there is existing transmission during the TBTT. The beacon frames are used to synchronize all devices in the network, as well as to provide other important control information of the network.

Depending on the mode in which the IEEE 802.11 MAC standard is implemented, the device that broadcasts the beacon frames may differ. In the Infrastructure mode (centralized-based mode) of the IEEE 802.11 standard, only the Access Point (AP) device broadcasts a beacon frame during each TBTT. In the Independent Basic Service Set (IBSS) mode (also known as 'Ad-hoc mode'), every device in the network will attempt to broadcast a beacon frame during each TBTT. However, through contention, only a single device will be able to successfully send out a beacon frame at each TBTT. During other times other that the TBTTs, the devices share the medium access time using either a 'Distributed Coordination Function' (DCF) or a 'Point Coordination Function' (PCF). The DCF uses a commonly known 'Carrier Sense Multiple Access with Collision Avoidance' (CSMA/CA) technique. In order to provide for prioritized medium access, the IEEE 802.11 standard provides different 'Interframe Spaces' (IFSs) of varying duration to be used for delay before performing the backoff required to contend for medium access. The 4 different IFSs are 'Short Interframe Space' (SIFS), 'PCF Interfame Space' (PIFS), 'DCF Interframe Space' (DIFS) and 'Extended Interframe Space' (EIFS). FIG. 5 illustrates medium access using the DCF according to the IEEE 802.11 standard, and the relationships between the SIFS, the PIFS and the DIFS.

FIG. 6 illustrates medium access using the PCF according to the IEEE 802.11 standard. The PCF is a contention-free transfer protocol based on a polling scheme controlled by a Point Coordinator (PC) operating at the AP. The PC gains control of the medium at the beginning of the contention-free period (CFP) and attempts to maintain control for the entire CFP by waiting a shorter time between transmissions than other devices using the DCF access procedure.

Besides the IEEE 802.11 WLAN standards, IEEE has also defined standards for a Wireless Personal Area Network (WPAN). One such WPAN standard is the IEEE 802.15.3 High Rate WPAN standard. In the IEEE 802.15.3 WPAN standard TDMA is also employed in the MAC layer. The medium access time is partitioned into periodic superframes. The IEEE 802.15.3 WPAN standard defines a centralized controlled topology as its network topology. Devices generally may be classified as being a normal operating device (DEV), or a device may assume the role of a Piconet Coordinator (PNC). The PNC broadcasts a beacon frame once every superframe. Any DEV that receives the beacon frame may choose to join the PNC's network, termed a piconet, hence forming a centralized controlled network that centres about the PNC. FIG. 7 illustrates a PNC 701 and DEVs 702 to 705 in wireless receiving range of the PNC. Hence, DEVs 702 to 705 are able to receive the beacon frame broadcasted by the PNC 701, while all devices 701 to 705 may exchange data within the piconet.

As is illustrated in FIG. 8, the superframe defined by the IEEE 802.15.3 standard is further partitioned into a beacon slot, a Contention Access Period (CAP) and a Channel Time Allocation Period (CTAP). The beacon slot is used by the PNC to broadcast a beacon frame without any contention. The CAP is used by the PNC and the DEVs for transmission of command/response or for contention-based traffic. The medium access time within the CTAP is divided into multiple slots reserved by the PNC for contention-free communication from DEVs.

The IEEE has further defined a standard for a WPAN which is targeted towards low rate devices. That standard is the IEEE 802.15.4 Low Rate WPAN standard. In that standard, 2 types of devices are defined, namely a Full Function Device (FFD) and a Reduced Function Device (RFD). Depending on the application requirements, the standard may operate in either of 2 topologies, namely a star topology or a peer-to-peer topology. FIG. 9 illustrates the star and peer-to-peer topologies of the IEEE 802.15.4 Low Rate WPAN standard, the position of the Personal Area Network (PAN) coordinator within those topologies, and communication flow between devices.

The IEEE 802.15.4 Low Rate WPAN standard uses TDMA in the MAC layer similar to the IEEE 802.15.3 High Rate WPAN standard. In the IEEE 802.15.4 standard devices may share the medium access time using the simple CSMA/CA technique. Optionally, superframe structures may be used. The format of the superframe is defined by the coordinator. As is illustrated in FIG. 10, the superframe is divided into 16 equally sized slots. Superframes are bounded by network beacons, which are sent by the coordinator.

For low-latency applications or applications requiring specific data bandwidth, the coordinator may dedicate portions of the active superframe to that the devices executing those applications. Such dedicated portions are termed Guaranteed Time Slots (GTSs). The GTSs form the CFP. As is illustrated in FIG. 11, the CFP always appears at the end of the active superframe starting at the slot immediately following the CAP.

Yet another High Rate WPAN protocol is that defined by the Multi-Band OFDM Alliance (MBOA) group. In order for every device in the WPAN to be able to form its own network, each device is required to broadcast a beacon frame in a distributed fashion. The MBOA MAC v0.93 standard defines a superframe of a device to have duration of 65536 μs. FIG. 12 illustrates a superframe according to the MBOA MAC v0.93 standard. The superframe is composed of 256 Media Access Slots (MAS) where each MAS has a duration of 256 μs. The first part of the superframe is reserved for beacon frame broadcasting. The number of MASs that is actually used for beacon frame broadcasting is defined as the Beacon Period (BP). The BP is sub-divided into Beacon Slots (BSs). The rest of the MASs in the superframe are used for data transfer, employing either a prioritized contention-based method, called Prioritized Channel Access (PCA), or a data reservation method, called Distributed Reservation Protocol (DRP). The BP is dynamic in length and consists of a dynamic number of BSs. The BP expands when new devices join the Beacon Group (BG) and contracts when devices leave the BG. The BG is defined as a group of devices which synchronizes their beacon frame transmissions within the same group of MASs and which identify these MASs as their BP. When two or more BGs come into range of each other, devices are required to coalesce to a single BP, combining into a single BG. The BP of one of the BG will be expanded to accommodate beacon frames of other joining devices from other BGs.

In practical usage scenarios, many wireless medium access control issues are present. One such an issue is the issue of mobility. Depending on applications and the nature of the devices within a wireless network, the network may either have a static topology or a dynamic topology whereby devices enter and leave the network frequently. For dynamic topologies, due to the mobility of devices in the network, a certain degree of ad-hoc connectivity has to be supported by the medium access control. In addition, due to devices' mobility, transmissions from a source device, with such transmissions being either broadcasts of beacon frames or transmission of data frames, may have a high probability of collision with the transmission of another device within the network. For MAC employing beacon frames for synchronization as well as to broadcast control information, beacon frames broadcast by 2 or more devices may collide due to mobility.

An example topology where this may occur is illustrated in FIG. 13 where devices 1302 and 1304 broadcast beacon frames. Devices 1301, 1303, 1305 and 1306 listen for such broadcasted beacon frames. If devices 1302 and 1304 chose the same time slot to broadcast their respective beacon frames, and those devices 1302 and 1304 are in positions such that a device, such as device 1303, is in broadcast range of both devices 1302 and 1304, then the beacon frames broadcast from the devices 1302 and 1304 will collide. Both devices 1302 and 1304 will be unable to detect this collision as reception during transmission is typically not provided for. In order for a device to receive at the same time as that device transmits required extra complexity to be employed, which includes the implementation of multiple antennas. It is assumed that beacon frames are sent without contention, as contention will result in delays caused by contention backoff, causing the timeliness of the beacon frames not to be guaranteed. The fact that device 1303 is unable to receive the beacon frames of both devices 1302 and 1304 is used by certain MAC designs to provide feedback to devices 1302 and 1304 to inform those devices that their beacon frames are not properly received, thus indicating that there may be a beacon frame collision. Devices 1302 and 1304 may then take action to change to other time slots to broadcast their respective beacon frames.

However, consider the case illustrated in the topology shown in FIG. 14 where the devices broadcasting beacon frames are devices 1402 and 1403. In this case there is no other device in broadcasting range of both of the beacon frame broadcasting devices 1402 and 1403. The beacon frame broadcasting devices 1402 and 1403 are unable to detect any beacon frame collision because they use the same beaconing slot to broadcast their beacon frames. Hence, devices 1402 and 1403 are unable to discover each other, and consequently unable to communicate with each other although they are in wireless range.

Another common issue for wireless medium access control is the problem of Simultaneous Operating Piconet (SOP). The SOP problem is very often encountered by MAC design based on centralized control. FIG. 15 shows a wireless network topology including 3 device 1503, 1508 and 1509 broadcasting their beacon frames. The wireless ranges of those devices 1503, 1508 and 1509 are indicated by the boundaries 1512, 1513 and 1514 respectively. In a centralised model where devices 1503, 1508 and 1509 act as central coordinators, devices 1504 and 1506 may be unable to communicate with each other as those devices 1504 and 1506 are connected to different central coordinators 1503 and 1508 respectively, although they may be in wireless range of each other.

Another SOP problem exists for beaconing frame broadcasting devices 1508 and 1509. When 2 beacon frame broadcasting devices exist in the same wireless space, like in the case of devices 1508 and 1509, one possibility is that one of the devices 1508 or 1509 will have to join the other network. Alternatively, some additional protocol is required to ensure such devices can coexist together.

Quality of Service (QoS) is also an issue for wireless medium access control. In case of low latency applications or applications requiring specific data bandwidth some means to provide for guaranteed time access is required. To provide for QoS, contention-based medium access is not appropriate as medium access is not guaranteed. This is because contention based medium access is subjected to time delays for medium sensing, random backoff and collision.

The Aloha protocol discusses above has the problem of being unable to provide QoS as the collision of data packets is very common.

As for the IEEE 802.11 MAC standard, the infrastructure mode does not support mobility of the network, as that standard requires a static AP. If the AP is moved out of the wireless network, or switch off, the entire network collapses. As for the IBSS mode, although mobility is supported, beacon frames are transmitted through contention, and for reasons described above, this solution is subject to time delays. Another downside is that only a single beacon frame can be transmitted once in each superframe. This means that in a network of many devices, it may take a long time to discover a particular device, subjected to whether that device can successfully content for the medium to broadcast its beacon frame.

For IEEE 802.15.3 High Rate WPAN, although support for QoS is present via CTAP reservation, the protocol is also based on centralized control. Similar to the infrastructure mode of the IEEE 802.11 standard, if the PNC is moved out of the wireless network, or suddenly powered off, the network will temporarily cease functioning. However in the IEEE 802.15.3 standard, another device can resume the role of PNC, thus providing a mean for the network to continue functioning. The main problem with the IEEE 802.15.3 standard is that of SOP discussed with reference to FIG. 15.

As for the IEEE 802.15.4 standard, the problem of beacon frame collision discussed with reference to FIGS. 13 and 14 is present in wireless networks according to that standard. In addition, that standard makes no provision for multiple devices to broadcast beacon frames in the same wireless space.

The problem of beacon frame collision also occurs in wireless networks according to the MBOA MAC v0.93 standard. In fact, the problem may be worse in the case of the MBOA MAC v0.93 standard as every device in the network is mandated to broadcast beacon frames. This is undesirable, especially in the case of battery-powered slave devices as this solution causes such devices to consume additional power, or in the case of devices choosing to stay in a passive mode. In addition, the additional dynamic BP contraction, expansion and merging procedure required poses additional complexity as well as power consumption.

As can be seen from the problems associated in various MAC protocols, a need still exists for a relatively low complexity medium access protocol that provides for mobility, SOP and QoS.

SUMMARY

It is an object of the present invention to substantially overcome, or at least ameliorate, one or more disadvantages of existing arrangements.

According to a first aspect of the present invention, there is provided a method of controlling medium access in a wireless network, said method comprising:

partitioning the medium access time into equal sized slots, a predetermined number of said slots forming a superframe;

within each superframe and for a beaconing device in said wireless network, designating one of said slots as a beacon medium access slot for said beaconing device;

broadcasting by said beaconing device, and during said beacon medium access slot, a beacon frame to other devices in wireless range of said beaconing device.

According to another aspect of the present invention, there is provided devices forming a wireless network implementing the aforementioned method.

Other aspects of the invention are also disclosed.

BRIEF DESCRIPTION OF THE DRAWINGS

Some aspects of the prior art and one or more embodiments of the present invention will now be described with reference to the drawings, in which:

FIG. 24 shows how Medium Access Slots used for Beacon Medium Access Slots can be announced using a bitmap;

FIG. 25 shows how Medium Access Slots reserved for contention-less data transfer can be announced using a bitmap;

FIG. 26 tabulates a sequence of events which leads to the detection and resolution of a BMAS collision;

FIG. 27 tabulates a sequence of events which leads to the detection and resolution of a BMAS collision in the topology shown in FIG. 14;

FIG. 28 illustrates 4 scenarios (cases) of possible data reservation;

DETAILED DESCRIPTION

A wireless medium access control (MAC) protocol is described which allows devices to join a network in an ad-hoc manner. Software implementing the disclosed MAC protocol resides in a control and timing section of the devices.

The devices within the disclosed wireless medium access control protocol are classified as either a beaconing device (BDEV) or a passive device (PDEV). A BDEV is a device that performs periodic beaconing. Beaconing allows other devices in range of the BDEV performing the beaconing to discover that BDEV. Once another device has discovered the BDEV, that device may initiate communication with the BDEV. BDEVs typically include laptop computers and personal digital assistants (PDAs). A PDEV on the other hand does not perform beaconing. Accordingly, PDEVs are not discoverable by other devices. However, PDEVs may initiate communication with BDEVs. PDEVs are typically small battery powered devices where power consumption is of topmost priority, or passive devices like digital camera. A device may switch from being a PDEV to being a BDEV, and vice versa.

Figure 16:
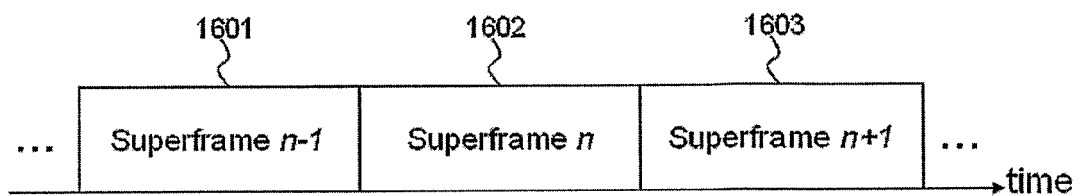
FIG. 16 illustrates the manner in which the medium access time is partitioned into superframes according to the present disclosure.

Within the disclosed wireless medium access control protocol the medium access time is partitioned into superframes. Each superframe has a predetermined fixed size. FIG. 16 illustrates the medium access time being partitioned into superframes, with superframes 1601, 1602 and 1603 being shown.

Figure 17:
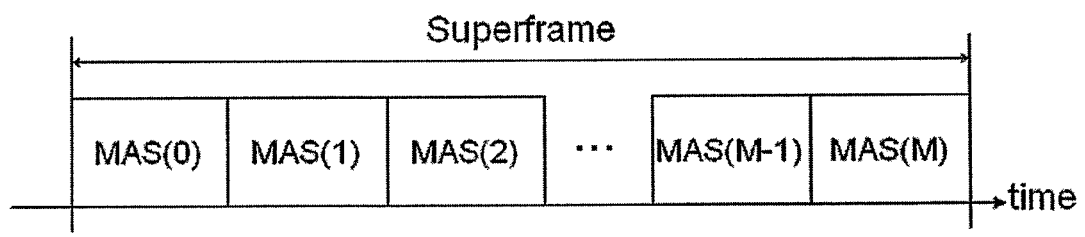
FIG. 17 illustrates a single superframe which is partitioned into M+1 Medium Access Slots.

The medium access time within each superframe is further partitioned into a fixed number of equal sized slots, called Medium Access Slot (MAS). The fixed number of MASs in each superframe may be 8, 16, 64, 256 etc. FIG. 17 illustrates a single superframe which is partitioned into (M+1) MASs. In order to synchronize the boundaries of MASs between 2 or more devices that move into range an arbitrary slot synchronization method is employed, as is known in the art.

Within each superframe, one of the MASs is defined as a Beacon Medium Access Slot (BMAS). The BMAS is composed of a plurality of Beacon Slots (BSs) and a Contention Access Period (CAP). The BMAS is used by the BDEVs to broadcast a beacon frame, as well as to provide medium access time for contention-based traffic between devices. Each BDEV broadcasts a beacon frame in one of the BSs. The particular BS used by the BDEV to broadcast its beacon frame in is selected randomly in advance of the present superframe. The BS used by a particular BDEV for broadcasting its beacon frame may vary from superframe to superframe. Alternatively, once a BS is selected, the same BS may be used by the BDEV for a number of consecutive superframes before selecting a different BS to be used.

The CAP is a medium access time period during which any device may contend for medium access time to be used by that device for sending data packets. The CAP may also be used by the BDEVs to contend for medium access time to transmit control packets. Contention for the transmission of control packets has a higher priority than that for sending data packets. The contention method used during the CAP may be any contention method, such as Carrier Sense Multiple Access/Collision Avoidance (CSMA/CA).

Figure 18:
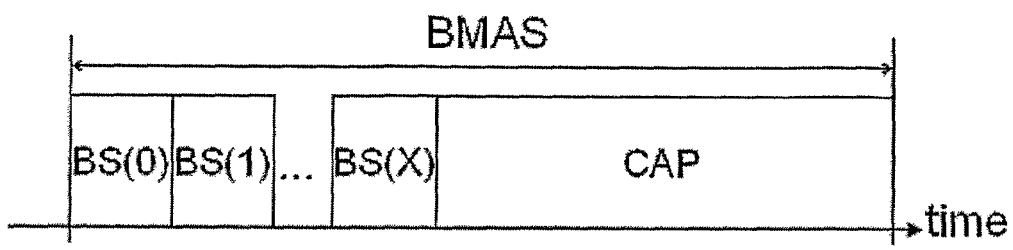
FIGS. 18 and 19 illustrate 2 possible arrangements of Beacon Slots and a Contention Access Period within the Beacon Medium Access Slot.
Figure 19:
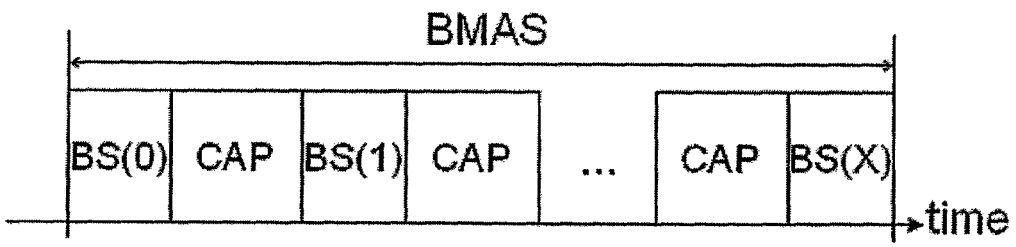

Within the BMAS, the disclosed wireless medium access control protocol imposes no restriction on how the BSs and the CAP are arranged. The only restriction imposed by the wireless medium access control protocol is that the arrangement adopted has to be consistent. FIGS. 18 and 19 illustrate 2 such possible arrangements of the BSs and the CAP within the BMAS. In the arrangement illustrated in FIG. 18 (X+1) BSs are followed by a single CAP making up the remainder of the BMAS. The arrangement illustrated in FIG. 19 also comprises (X+1) BSs, but each BS is followed by a CAP.

The remaining MASs that are not defined as the BMAS are free to be reserved for contention-free data traffic. All devices, that is both PDEVs and BDEVs, are required to listen during all BMASs of the superframe for beacons as well as control frames or contention-based data sent during the CAP.

To enable neighbouring BDEV as well as PDEVs to know which MAS is defined as the BMAS, every BDEV broadcasts such information during their respective beacon frames. For example, the BDEVs may broadcast this information using a BMAS bitmap during their respective beacon frames. Similarly, MAS blocks reserved for contention-free traffic is announced in the same manner.

The fact that any one of the MASs of the superframe may be defined to be the BMAS means that the disclosed wireless medium access control protocol supports Simultaneous Operating Piconet (SOP). In any one superframe, there may be a number of MASs defined by different BDEVs as their respective BMASs. Data reservations are always made toward a BDEV. A source device may either be a PDEV or another BDEV device, but the destination device is always a BDEV.

Figure 20:
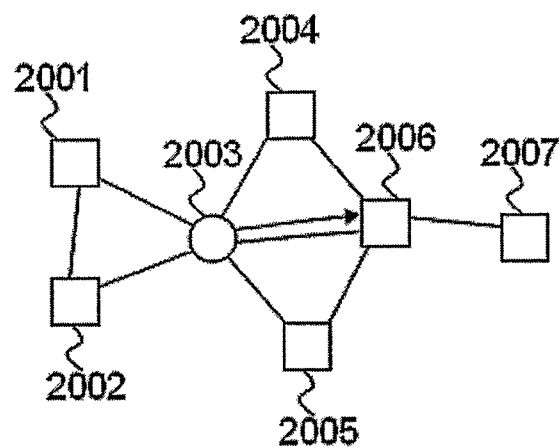
FIG. 20 shows an example network topology including a number of devices in a wireless network.

The following naming convention is defined here to aid the explanation. A Request Device (RDEV) is the PDEV or BDEV (source device) that is making the data reservation. A Request Target BDEV (RT_BDEV) is the BDEV that the RDEV sends the reservation request to. A Request Neighbour BDEV (RN_BDEV) is a BDEV that is a neighbour of one of the RT_BDEVs. To further illustrate the naming convention, refer to FIG. 20 in which a topology including a number of devices 2001 to 2007 in a wireless network is shown. Devices 2001, 2002, and 2004 to 2007 are BDEVs, whereas device 2003 is a PDEV. The lines between the devices 2001 to 2007 illustrate their neighbour relationships.

Consider the case where the PDEV 2003 wishes to make a reservation in order to communicate with BDEV 2006. In that case the PDEV 2003 (source device) is the RDEV. A data reservation procedure involves 3 stages, namely a request stage, a response stage and a notification stage. In the request stage, the RDEV sends a reservation request packet during the CAP of the RT_BDEV. The reservation request packet at least identifies the destination BDEV of the reservation request. The RT_BDEVs are the BDEVs that the RDEV has to send the reservation request to in order to be sure that all BDEVs in the neighbourhood of the RDEV receives the reservation request. In the topology shown in FIG. 20, one possible choice of RT_BDEVs may consist of the destination BDEV 2006 itself, and BDEV 2001. This choice of RT_BDEVs is enough to ensure that all devices in the neighbourhood of the RDEV 2003 receive the reservation request. The reason for this is because BDEV 2002 is able to receive the CAP of RT_BDEV 2001, whereas BDEVs 2004 and 2005 are able to receive the CAP of RT_BDEV 2006. In the present case the BDEVs 2002, 2004 and 2005 are the RN_BDEVs. Hence, each RN_BDEV is a neighbour of the RDEV as well as at least one RT_BDEV.

In the response stage of the data reservation procedure all RT_BDEVs need to respond to the reservation request sent by the RDEV by sending an accept or a reject response packet during their respective CAPs. In additional, any RN_BDEV may optionally object to the reservation request by sending an objection packet during its CAP. The RDEV then collects all the responses from RT_BDEVs and object packets from RN_BDEVs, if any.

If all RT_BDEVs accept the reservation request and there are no objections from any RN_BDEVs, the reservation request is considered to be accepted by every BDEV. In the notification stage, the RDEV announces during the CAPs of the RT_BDEVs the outcome of the reservation request, that is whether the reservation request has been accepted by all its neighbouring BDEVs. In the case where the reservation request has been accepted by all BDEVs, all BDEVs announce the MAS reserved by the RDEV in their respective beacon frames. The RDEV 2003 may then start using the reserved MAS for sending contention-free packets to the BDEV 2006.

Figure 21:
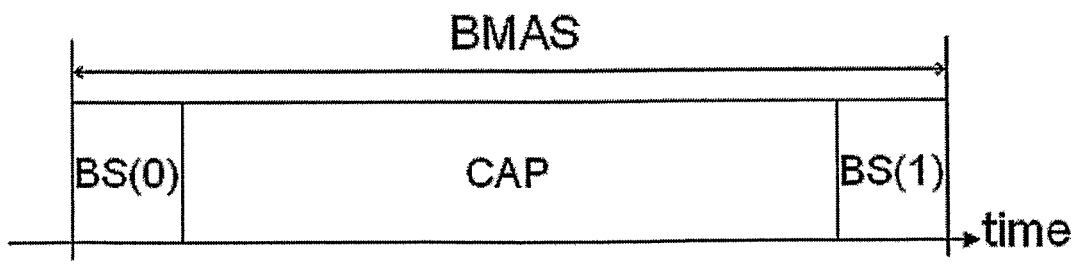
FIG. 21 illustrates the arrangement of the Beacon Medium Access Slot of the preferred implementation.

Having described the wireless medium access control protocol of the disclosure generally, the preferred implementation of the same is now described. FIG. 21 illustrates the arrangement of the BMAS of the preferred implementation, which contains 2 BSs positioned at either end of the BMAS and separated by the CAP. For ease of explanation, the number of MASs in each superframe is chosen to be only 16. The BS that is to be used for beaconing changes every superframe. In each particular superframe the BS to be used in the next superframe is selected randomly and broadcast during the present superframe.

Figure 22:
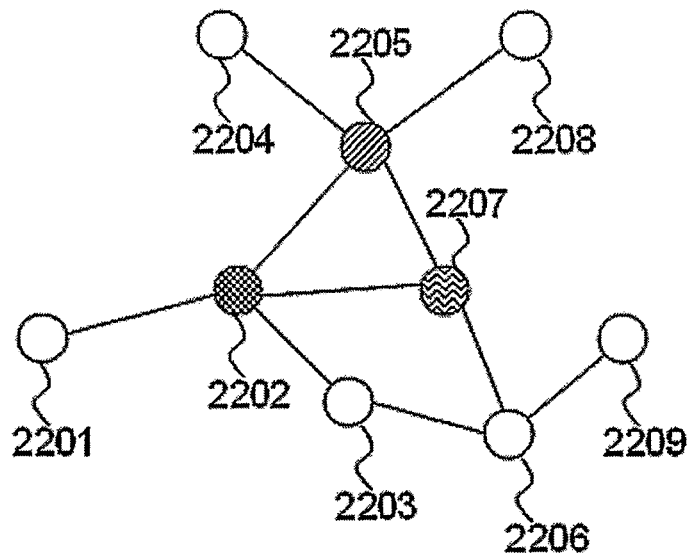
FIG. 22 shows another example network topology.
Figure 23:
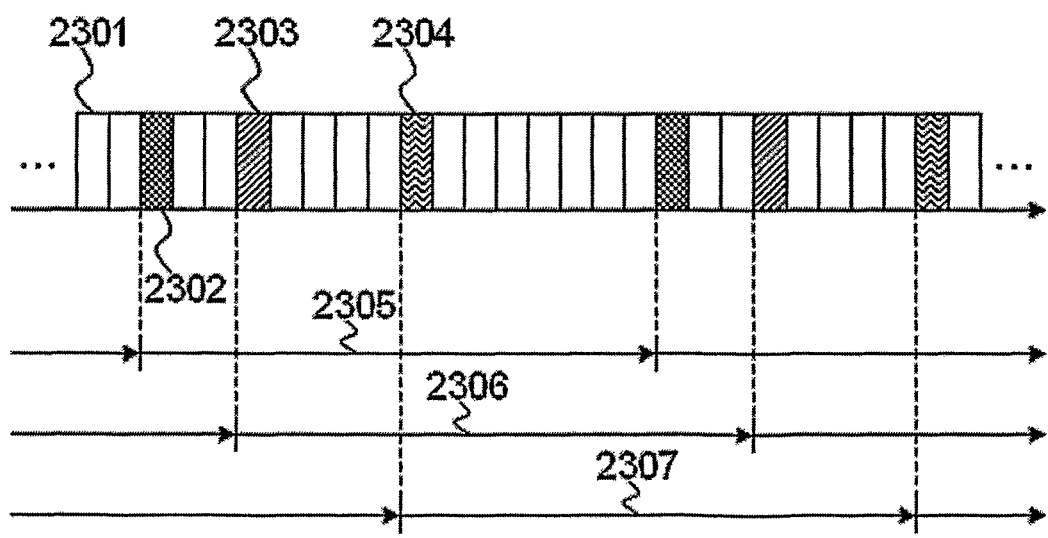
FIG. 23 shows Medium Access Slots occurring in the example network topology shown in FIG. 22.

Consider the example network topology shown in FIG. 22 comprising devices 2201 to 2209. In this example topology devices 2202, 2205 and 2207 are the BDEVs and devices 2201, 2203, 2204, 2206, 2208 and 2209 are PDEVs. Again the lines between devices 2001 to 2209 illustrate the neighbourhood relationship between devices 2001 to 2009. FIG. 23 shows MASs occurring in the example network topology shown in FIG. 22. In particular, the superframes 2305, 2306 and 2307 of the BDEVs 2202, 2205 and 2207 respectively are illustrated as they occur in medium access time. Each superframe 2305, 2306 and 2307 is partitioned into 16 MASs. Blocks 2302, 2303 and 2304 represents the BMASs of BDEVs 2202, 2205 and 2207 respectively, whereas block 2301 represents an empty MAS that can be allocated for contention-free traffic.

In order for each of the BDEVs 2202, 2205 and 2207 shown in FIG. 22 to broadcast to neighbouring devices which MASs are reserved for BMASs, the BMAS bitmaps as shown in FIG. 24 are used. In particular, 2401, 2402 and 2403 represent the superframes 2305, 2306 and 2307 shown in FIG. 23 in bitmap form. The shaded blocks correspond to the MASs that are reserved for BMASs as they occur relative to the superframes 2305, 2306 and 2307.

Using the rightmost bit as the Least Significant Bit (LSB), the BMAS bitmaps of superframes 2305, 2306 and 2307 are calculated as 0000000100001001, 0010000000100001, and 0000100100000001 respectively. Equivalently, the BMAS bitmaps of superframes 2305, 2306 and 2307 may be represented in hexadecimal form as 01 09, 20 21, and 09 01 respectively. As can be seen from the example, the BMAS bitmap takes up only 2 bytes each for a 16-MAS implementation. For implementations where the superframes are partitioned into a greater number of MASs, it may be more feasible to broadcast a list of BMAS positions, since the number of BDEVs in the network topology is usually much less than the number of MASs.

A bitmap similar to that used by the BDEVs 2202, 2205, 2208 to broadcast which MASs are reserved for BMASs may be used to broadcast which for MASs are reserved for data transmission. In addition to the BMAS bitmaps as shown in FIG. 24, FIG. 25 also shows data bitmaps associated with MASs that are reserved for data transmission. Superframes 2501, 2502 and 2503 represent the superframes 2305, 2306 and 2307 shown in FIG. 23 in bitmap form. The crossed-out blocks correspond to the MASs that are reserved for data transmission as they occur relative to the superframes 2305, 2306 and 2307.

Again, using the rightmost bit as the LSB, the data bitmaps of superframes 2505, 2506 and 2507 are calculated as 1100000001110010, 0101100000001110, and 0111001011000000 respectively. Equivalently, the data bitmaps of superframes 2505, 2506 and 2507 may be represented in hexadecimal form as C0 72, 58 0E, and 72 C0 respectively.

Figure 1:
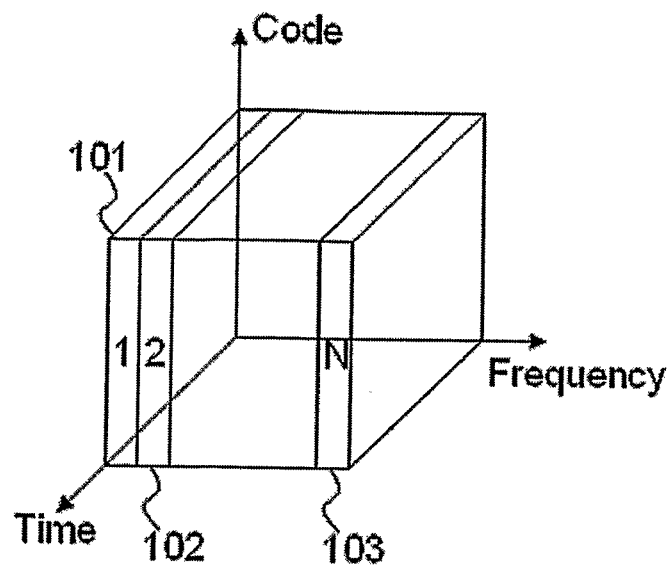
FIG. 1 illustrates the manner in which FDMA partitions the frequency spectrum into N frequency channels.
Figure 2:
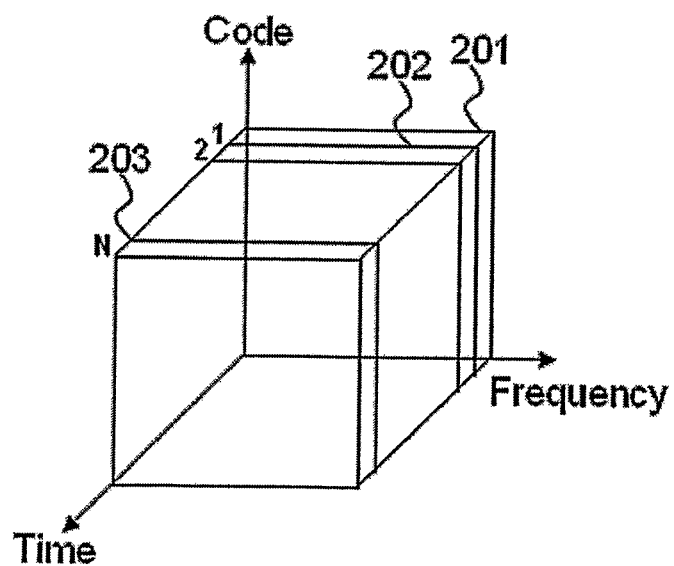
FIG. 2 illustrates the manner in which TDMA partitions the medium access time into N time slots.
Figure 3:
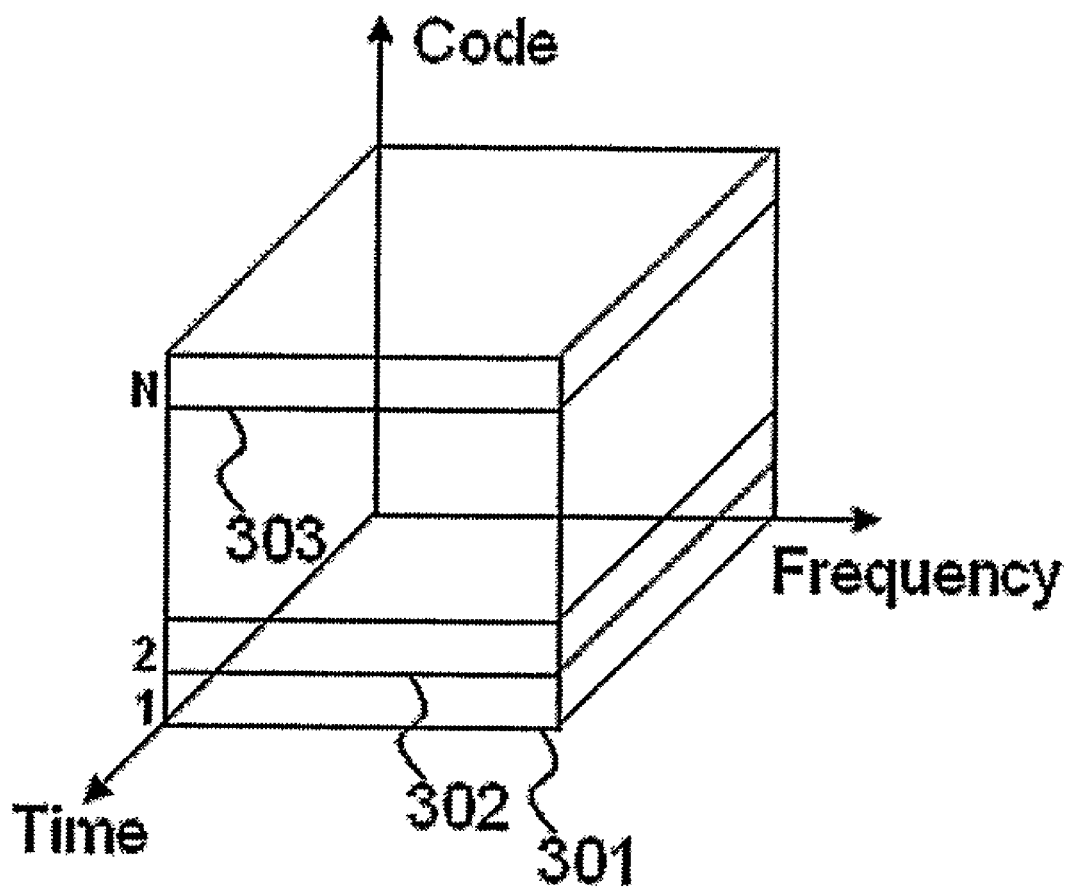
FIG. 3 illustrates the manner in which CDMA allocates different codes to different transmissions.
Figure 4:
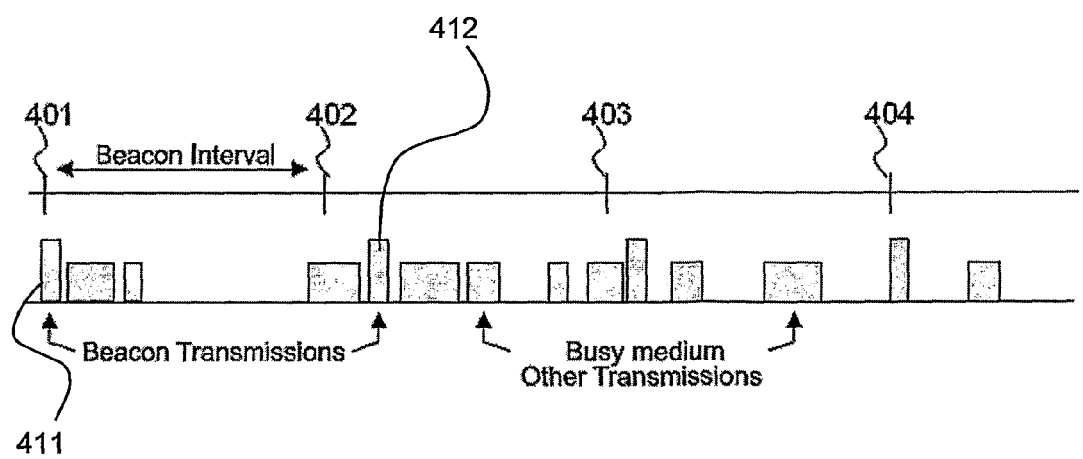
FIG. 4 shows the transmission of beacon frames according to the IEEE 802.11 standard.
Figure 5:
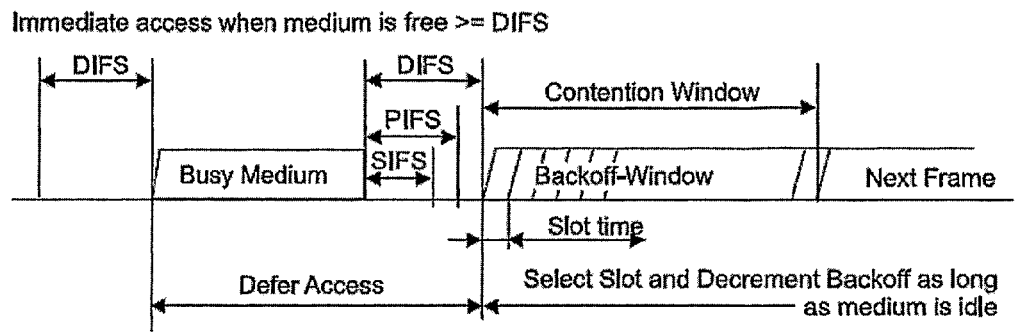
FIG. 5 illustrates medium access using the Distributed Coordination Function according to the IEEE 802.11 standard.
Figure 6:
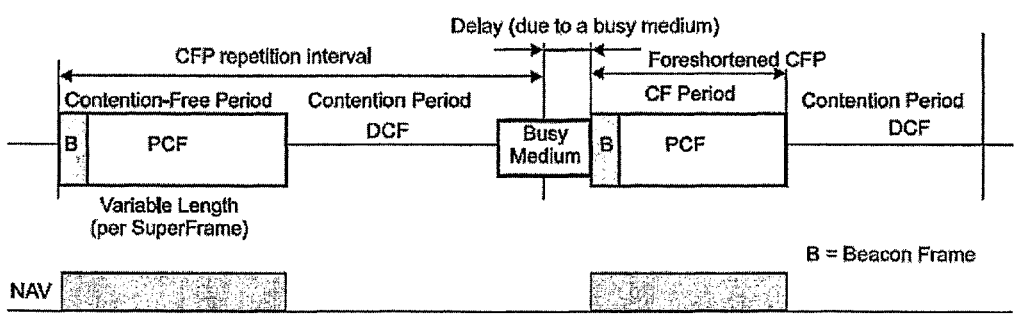
FIG. 6 illustrates medium access using the Point Coordination Function according to the IEEE 802.11 standard.
Figure 7:
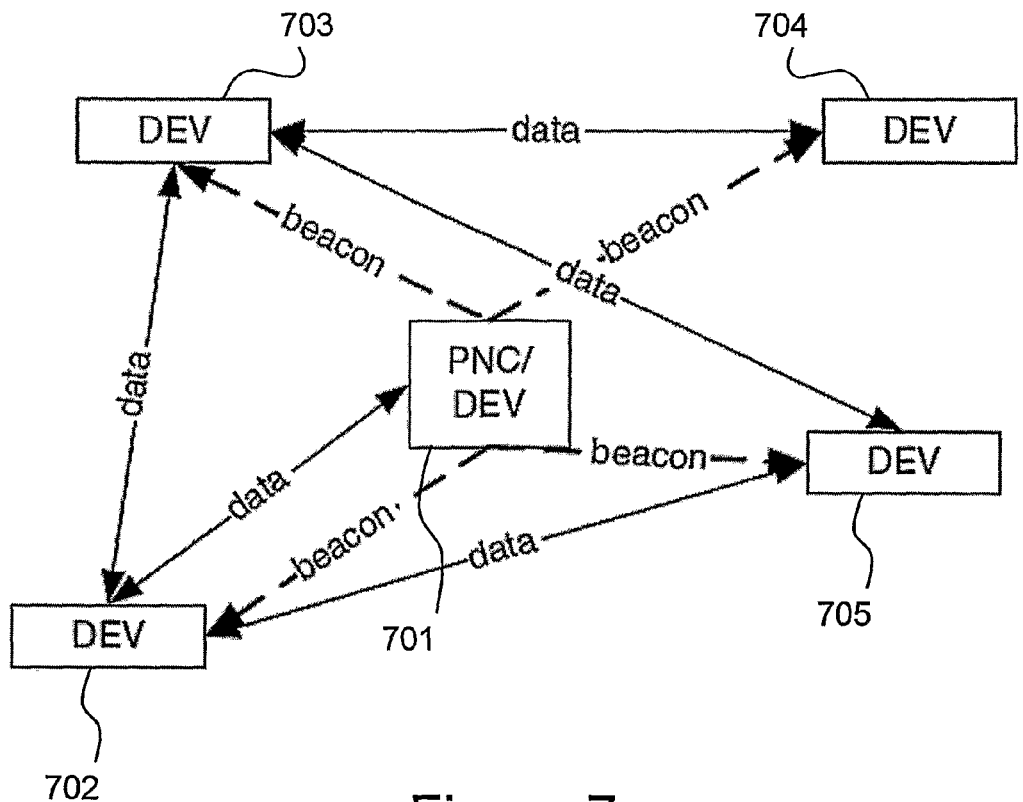
FIG. 7 illustrates a piconet including a Piconet Coordinator and a number of normal operating devices.
Figure 8:
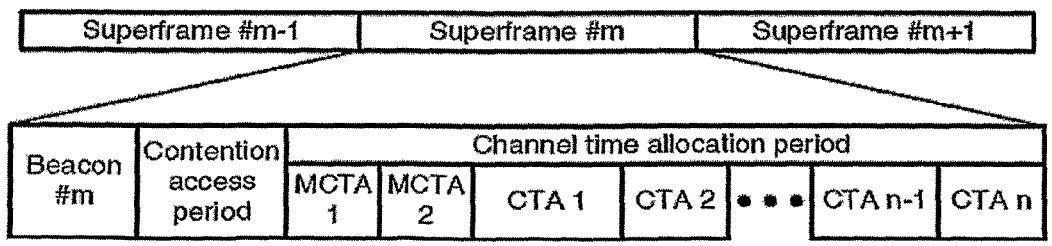
FIG. 8 illustrates the partitioning of a superframe defined by the IEEE 802.15.3 standard.
Figure 9:
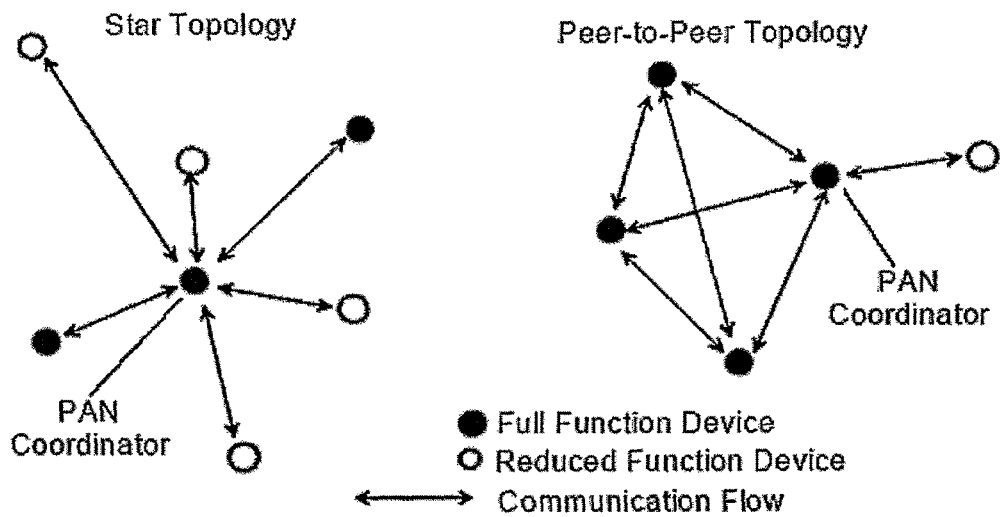
FIG. 9 illustrates the star and peer-to-peer topologies of the IEEE 802.15.4 Low Rate WPAN standard.
Figure 10:
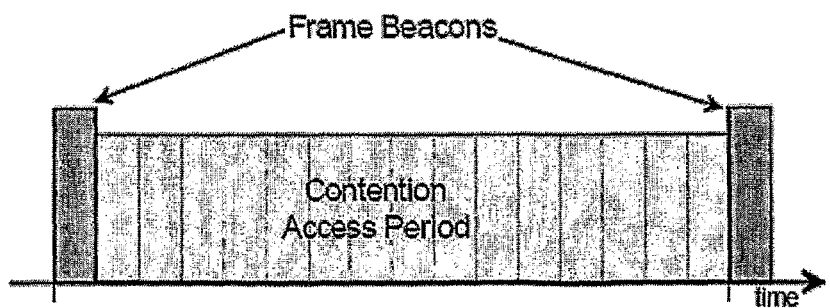
FIG. 10 shows the superframe structure defined in the IEEE 802.15.4 standard where a Contention Free Period is absent.
Figure 11:
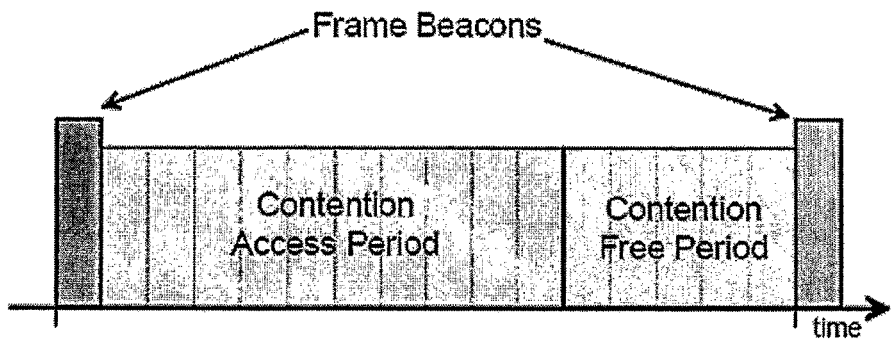
FIG. 11 shows the superframe structure defined in the IEEE 802.15.4 standard where a Contention Free Period is present.
Figure 12:
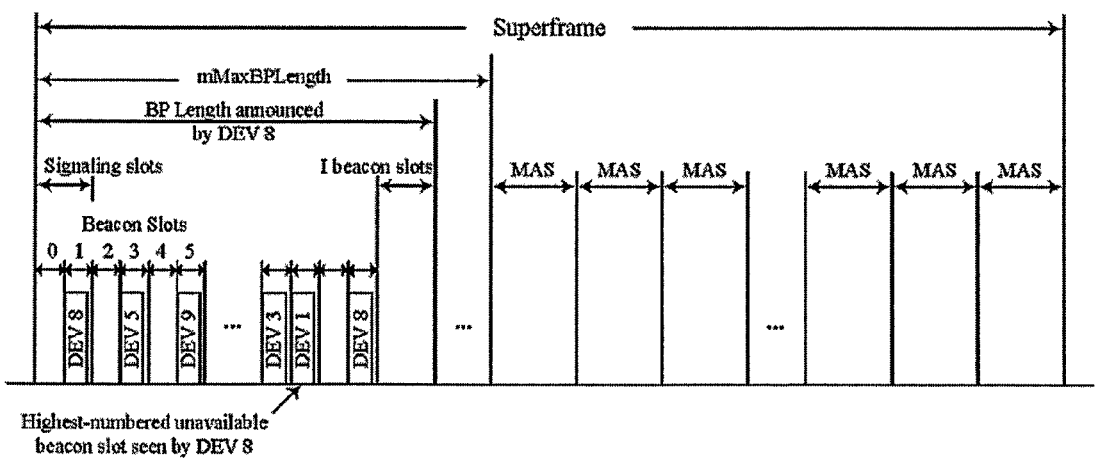
FIG. 12 shows the superframe structure according to the MBOA MAC v0.93 standard.
Figure 13:
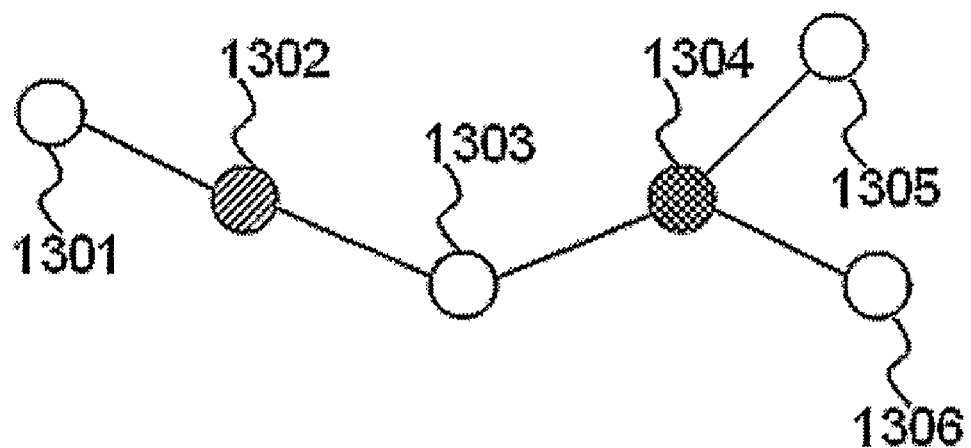
FIG. 13 shows a beacon frame collision scenario whereby a common device is present.

A beacon collision detection method used in the disclosed wireless medium access control protocol is next described. Beacon collision occurs when 2 or more BDEVs choose the same MAS in access time, which may be different MASs within their respective superframes, as their BMASs, and subsequently use the same BS to broadcast their beacon frame. Therefore, to avoid beacon collisions, no two BDEVs may use the same MAS for their BMAS. A mechanism is therefore provided to detect whether 2 or more BDEVs use the same MAS for their respective BMASs. Consider the network topology shown in FIG. 13 where device 1303 is in broadcast range of both BDEVs 1302 and 1304. FIG. 26 tabulates a sequence of events which leads to the detection and resolution of a BMAS collision. Let ADEV-1 and ADEV-2 used in the table of FIG. 26 correspond with BDEVs 1302 and 1304 respectively. FIG. 26 shows beacon diagrams for ADEV-1 and ADEV-2 at four different superframes, the respective positions (MAS) of the MASs that are used by the ADEV-1 and ADEV-2 as their BMASs, the respective positions (CBS) of the slots within the BMASs that are used for broadcasting their beacon frames, the next position (NBS) within the BMASs that to be used for broadcasting beacon frames, and the status within each superframe.

In superframe 1 both ADEV-1 and ADEV-2 have chosen MAS position 3 for their respective BMASs, as well as slot position 0 for broadcasting their respective beacon frames. Hence, a BMAS collision and a beacon frame collision have occurred. Accordingly, the PDEV 1303 (FIG. 13) is unable to receive the beacon frames correctly due to interference caused by broadcasting the beacon frames during the same BS.

In superframe 2 ADEV-1 and ADEV-2 still use MAS position 3 for their respective BMASs. The BS to be used for broadcasting the beacon frame is randomly chosen by each ADEV-1 and ADEV-2 during each superframe. Accordingly, both ADEV-1 and ADEV-2 now use slot position 1 for broadcasting their respective beacon frames. Again, a BMAS collision and a beacon frame collision have occurred which prevents the PDEV 1303 from receiving the beacon frames correctly. The PDEV 1303 is therefore able to deduce that a BMAS collision has occurred, and proceeds to announce the collision in the CAP using control packet priority. Since both BDEVs 1302 and 1304 will be listening to the CAP regardless of the BS they used to broadcast their beacon frames, both BDEVs 1302 and 1304 are thereby informed of the BMAS collision.

In superframe 3 ADEV-1 and ADEV-2 still use MAS position 3 as their respective BMASs, but now have randomly chosen different slot positions for broadcasting their respective beacon frames. In this case the PDEV 1303 is able to receive both beacon frames, but still detects a BMAS collision. In response to the collision announced by the PDEV 1303 during superframe 2 the BDEVs 1302 and 1304 randomly choose new MASs as their BMASs, and each announce in superframe 3 a BMAS change. In superframe 4 ADEV-1 has changed its BMAS to MAS position 7, while ADEV-2 has changed its BMAS to MAS position 11, thereby resolving the BMAS collision and therefore also the beacon collision.

Figure 14:
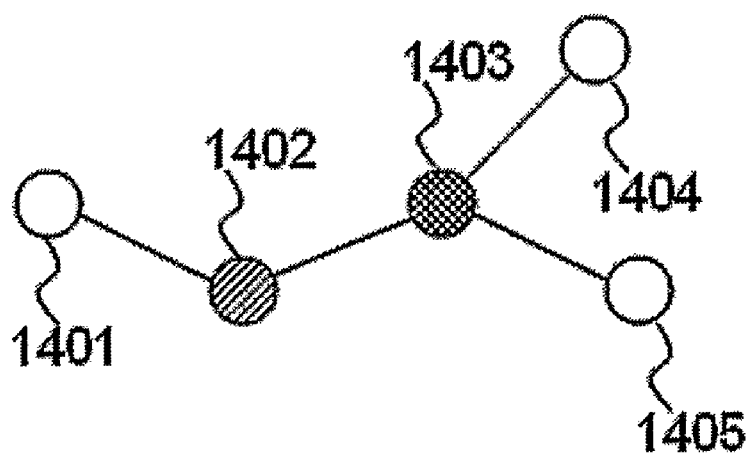
FIG. 14 shows a beacon frame collision scenario whereby a common device is absent.

FIG. 14 illustrates a worst case scenario network topology in which BDEVs 1402 and 1403 do not have a common PDEV in broadcast range. However, the disclosed wireless medium access control protocol is still able to detect BMAS collision for reasons described below. FIG. 27 tabulates a sequence of events which leads to the detection and resolution of a BMAS collision in the topology shown in FIG. 14. In this case, let ADEV-1 and ADEV-2 used in the table of FIG. 27 correspond with BDEVs 1402 and 1403 respectively.

In superframe 1 both ADEV-1 and ADEV-2 have chosen MAS position 3 for their respective BMASs, as well as slot position 0 for broadcasting their respective beacon frames. Even though a BMAS collision and a beacon frame collision have occurred, those collisions remain undetected as the other devices 1401, 1404 and 1405 are in broadcast range of only one of the BDEVs 1402 and 1403.

In superframe 2 ADEV-1 and ADEV-2 still use MAS position 3 for their respective BMASs, but now have randomly chosen slot position 1 for broadcasting their respective beacon frames. Again, even though a BMAS collision and a beacon frame collision have occurred, those collisions remain undetected.

In superframe 3 ADEV-1 and ADEV-2 still use MAS position 3 as their respective BMASs, but now have randomly chosen different slot positions for broadcasting their respective beacon frames. A BMAS collision is thus still caused. In this case the BDEVs 1402 and 1403 themselves are able to detect the BMAS collision as they would be listening for broadcasts in the access time periods in which they are not broadcasting or transmitting themselves. In response to the collision detected by the BDEVs 102 and 1403 during superframe 3, the BDEVs 1302 and 1304 randomly choose new MASs as their BMASs, and announce in superframe 3 a BMAS change. In superframe 4 ADEV-1 has changed its BMAS to MAS position 11, while ADEV-2 has changed its BMAS to MAS position 7. Accordingly, the BMAS collision has again been resolved, even in absence of a PDEV which is in broadcast range of both BDEVs 1401 and 1403.

Figure 15:
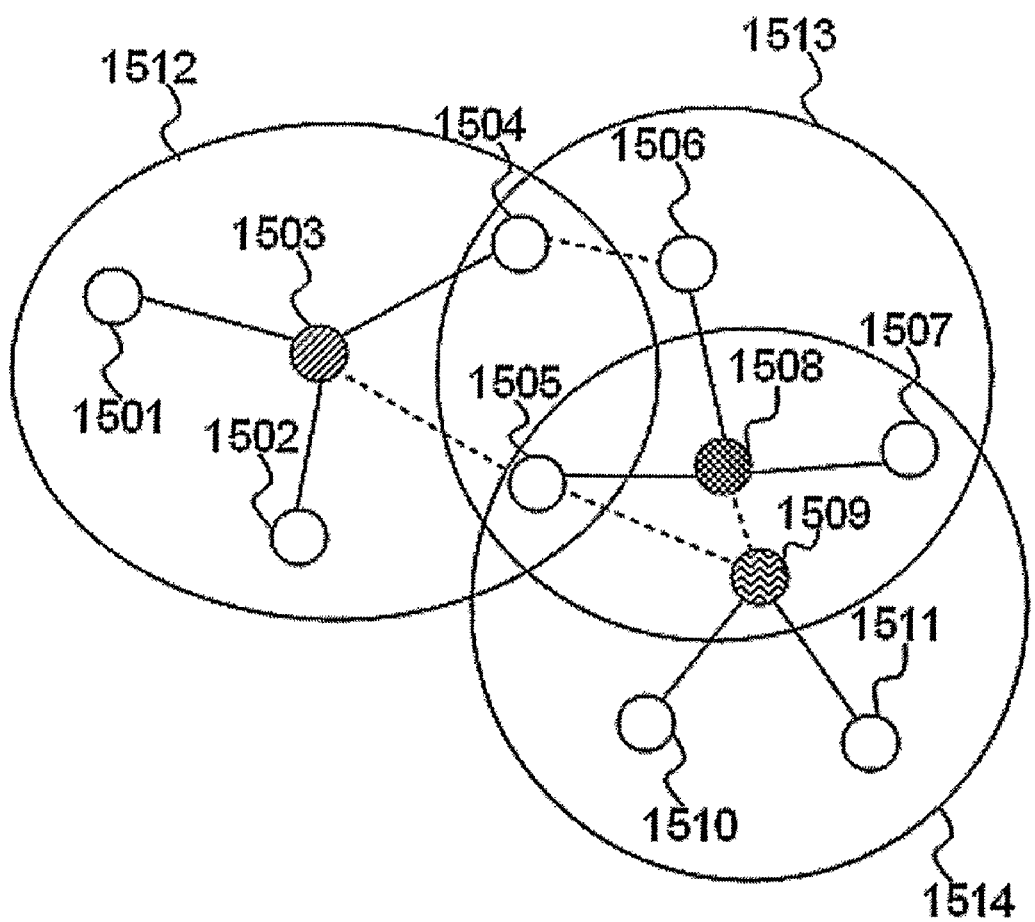
FIG. 15 shows a wireless network topology used to illustrate a Simultaneously Operating Piconet problem.

With regards to the problem of Simultaneous Operating Piconet (SOP) discussed with reference to FIG. 15, in the disclosed wireless medium access control protocol where any MAS may be used as a BMAS, coexistence of devices 1508 and 1509 becomes trivial. Both devices 1508 and 1509 simply select two different MASs to be their respective BMASs, which allows devices 1508 and 1509 to broadcast beacon frames in the shared wireless range. Devices in wireless range of 2 or more BDEVs 1503, 1508 and 1509, such as devices 1504, 1505 and 1507, are able to received multiple beacon frames due to the fact that the beaconing frames in different BMASs would not collide. As a result, devices 1504, 1505 and 1507 are not restricted to a particular centralized network. This enables data exchange between such devices 1504, 1505 and 1507 and multiple BDEVs 1503, 1508 and 1509.

The disclosed wireless medium access control protocol caters to data QoS requirements due to the fact that MAS reservation is supported for data traffic. However, reservation of MAS for data traffic is only allowed towards a BDEV. That is, a PDEV reserves MAS to send data to a BDEV or, a BDEV reserves MAS to send data to another BDEV. This restriction avoids the classic hidden terminal problem since PDEVs do not broadcast beacon frames and thus are not able to give indication of availability of MAS that can be reserved. With this restriction in place, the hidden-terminal problem caused when two PDEVs are within wireless range is eliminated. Since PDEVs do not broadcast beacon frames, when 2 PDEV are within wireless range, they may not know of data reservations of each other.

FIG. 28 illustrates 4 scenarios (cases) of possible data reservation. Devices 2801 and 2804 are BDEVs, whereas devices 2802 and 2803 are PDEVs. In restricting data reservation to be only possible toward a BDEV, only case #2 will be possible because only in case #2 is there no data packet collision at the receiving device.

To ensure the reservation do not collide or overlap any existing reservation in the wireless range a PDEV first ensures that the MAS that it wants to reserve is not reported as being used, for either BMAS or data, by any of the BDEVs in wireless range. In addition, a reservation is only considered successful if all BDEVs approve of the reservation. In order to achieve this, a PDEV makes a reservation by sending a reservation request to the RT_BDEVs in their CAP.

Figure 29:
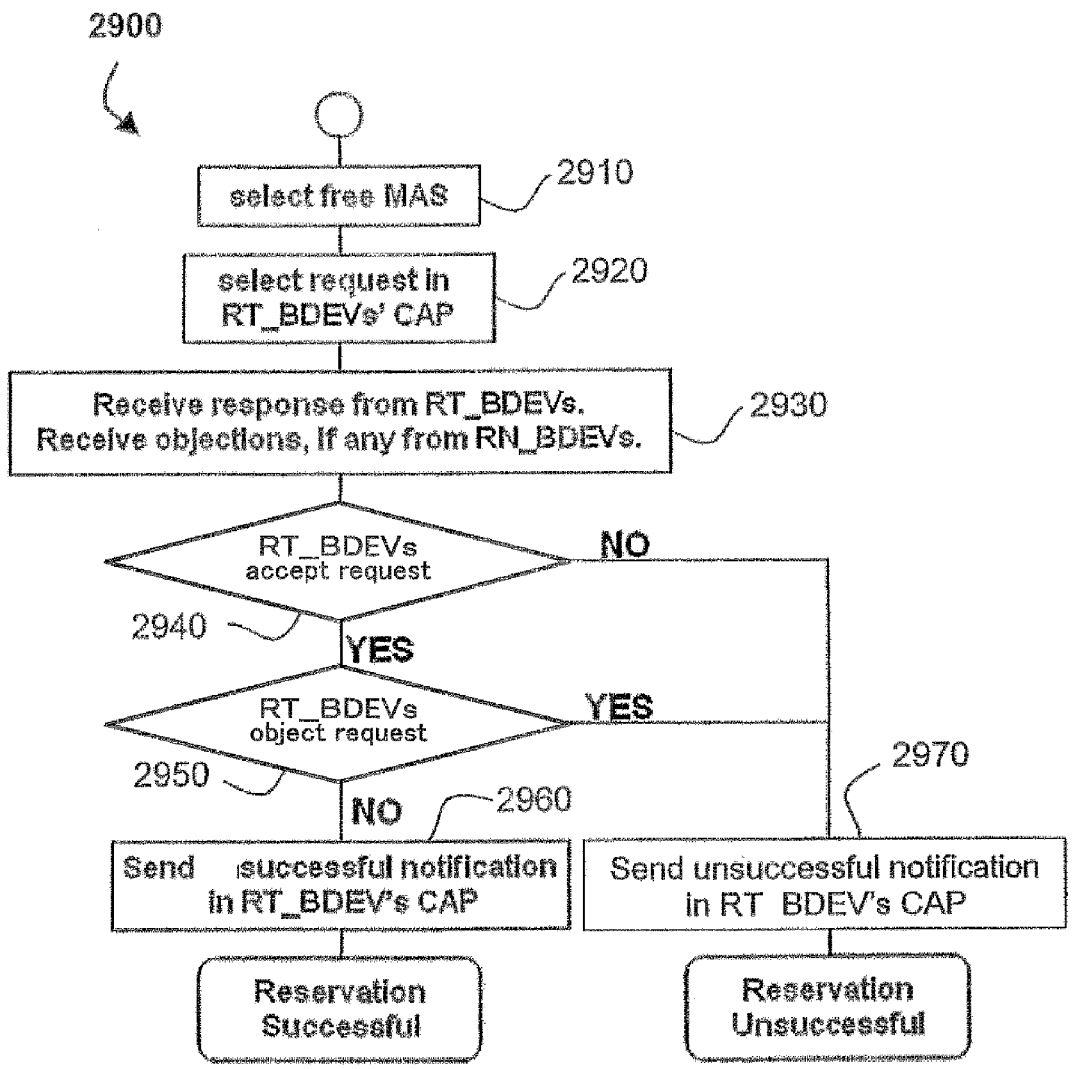
FIG. 29 shows a schematic flow diagram of an algorithm used by a RDEV to make a data reservation request.

FIG. 29 shows a schematic flow diagram of an algorithm 2900 used by a RDEV to make a data reservation request. As set out above, the RDEV first ensures that the MAS that it wants to reserve is not reported as being used. Accordingly, the RDEV selects unused MASs in step 2910, and makes a reservation request to RT_BDEVs in step 2920 by sending a request packet in the CAPs of those RT_BDEVs. The RT_B-DEVs in responds handle the reservation request in the manner described below with reference to FIG. 30.

In step 2930 the RDEV receives responses from the RT_B-DEVs, as well as objections, if any, from RN_BDEVs. The RDEV then determines in step 2940 whether all the RT_B-DEVs accepted the request, and if so, determines in step 2950 whether any RN_BDEV has objected to the request. If it is determined in step 2950 that the request has not been objected to then the reservation was successful and the RDEV sends in step 2960 a success notification packet in the CAPs of the RT_BDEVs. As is explained below, the RT_BDEVs and RN_BDEVs announce the reservation in their beacon frames from the following superframe onwards. The RDEV may then start using the reserved MAS to send contention-free data to the targeted BDEV.

If it is determined in step 2940 that any RT_BDEV has rejected the request, or in step 2950 that none of the RN_B-

DEVs objected to the request, then the request was unsuccessful, and the RDEV sends in step 2970 an unsuccessful notification packet in the CAPs of the RT_BDEVs.

Figure 30:
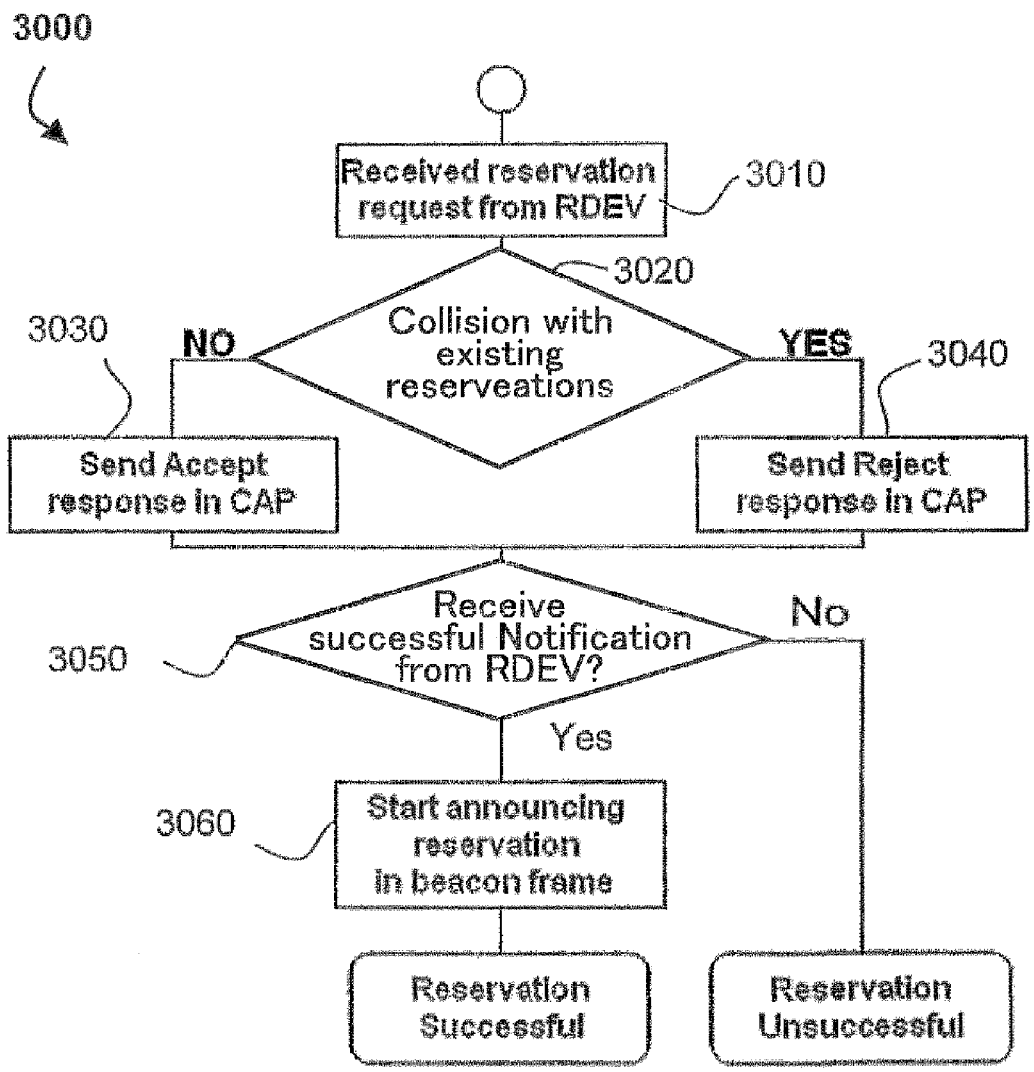
FIG. 30 shows a schematic flow diagram of an algorithm performed by each of the RT_BDEVs upon receiving a data reservation request from a RDEV.

FIG. 30 shows a schematic flow diagram of an algorithm 3000 performed by each of the RT_BDEVs upon receiving a data reservation request from a RDEV in step 3010. The RT_BDEV determines in step 3020 whether the received reservation request collides with any existing request. In the case where in is determined that no collision is present, the RT_BDEV sends in step 3030 an accept responds packet in its CAP. Alternatively, if is determined that a collision is present the RT_BDEV sends in step 3040 a reject responds packet in its CAP. The RT_BDEV then waits for a notification from the RDEV.

When the notification is received from the RDEV, the RT_BDEV determines in step 3050 whether the notification indicates successful reservation, or otherwise. In the case where the notification indicates success the RT_BDEV in step 3060 announces the reservation in its beacon frame from the following superframe onwards. Alternatively, in the case where the notification indicates unsuccessful reservation the RT_BDEV takes no action.

Figure 31:
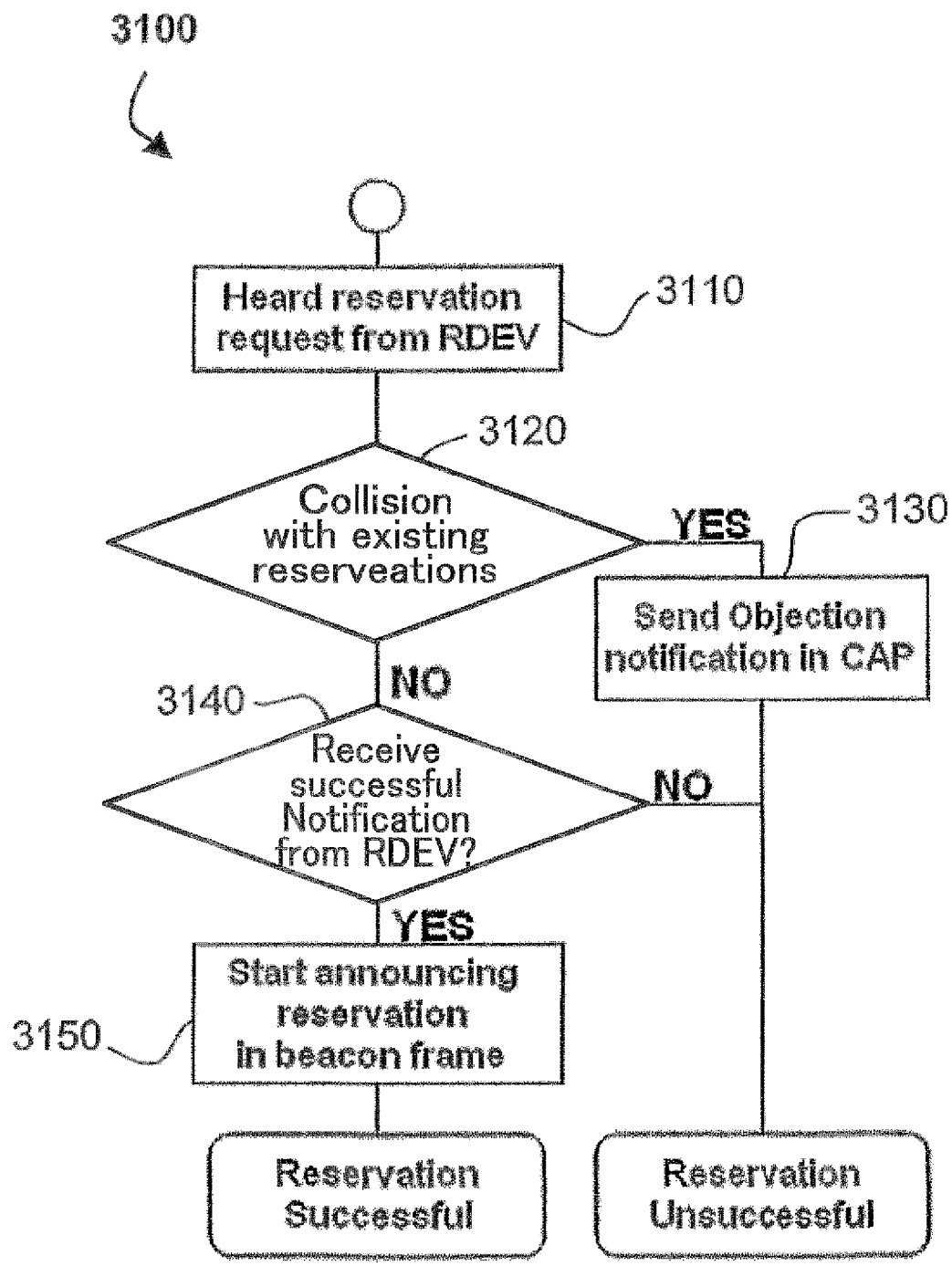
FIG. 31 shows a schematic flow diagram of an algorithm 3100 performed by each RN_BDEVs upon receiving a data reservation request from a RDEV.

FIG. 31 shows a schematic flow diagram of an algorithm 3100 performed by each RN_BDEVs upon receiving in step 3110 a data reservation request from a RDEV. The RN_BDEV accesses in step 3120 whether the request causes any collision with any BMAS or data reservation that is present. In normal circumstances the reservation will not collide with any existing reservation seen by RN_BDEV since the RDEV ensures the requested MAS is not reported to be used in the first place. However, the special circumstance where another RDEV makes a reservation request to that RN_BDEV using the same or overlapped MAS simultaneously may occur. In such a case the RN_BDEV objects to the reservation in step 3130 by sending an objection packet in its CAP. If it is determined in step 3120 that the request does not cause any collision with any BMAS or a data reservation that is present then the RN_BDEV merely waits for a notification from the RDEV with regards to the success of the request. Upon receipt of the notification the RN_BDEV determines in step 3140 whether the notification indicates success. In the case where the notification indicates an unsuccessful notification the algorithm 3100 terminates. Alternatively, in the case where the notification indicates success the RN_BDEV in step 3150 announces the reservation in its beacon frame from the following superframe onwards.

Ending a reservation may be initiated either by the target BDEV or the RDEV by sending an end reservation packet in the CAP of RT_BDEVs. All BDEVs (RT_BDEVs and RN_BDEVs) subsequently will stop broadcasting the reservation announcement in their beacon frames.

From the preceding description it would be clear that BDEVs may make use of any MAS within the superframe as their BMAS for use to broadcast its beacon frames and control packet or contention-based data traffic. Devices are able to enter or leave the wireless network without resulting in the ongoing network to alter its superframe structure. Ad-hoc connectivity is thus achieved. Also, there is no need for a common device to BDEVs in order for beacon collisions to be detected. Devices are able to communicate with multiple BDEVs in their wireless range. With BDEVs randomly selecting (different) MASs within the superframe for use as their BMASs, the broadcasting of beacon frames by multiple BDEVs is enabled.

The foregoing describes only some embodiments of the present invention, and modifications and/or changes can be made thereto without departing from the scope and spirit of the invention, the embodiments being illustrative and not restrictive.

We claim:

1. A method of controlling medium access by a beaconing device in a wireless network, said method comprising:
    partitioning, at said beaconing device, medium access time into equal sized slots, wherein a predetermined number of said slots form a superframe;
    designating, at said beaconing device, one slot, in each superframe, as a beacon medium access slot for said beaconing device;
    partitioning, at said beaconing device, said beacon medium access slot into a plurality of beacon medium access subslots, selecting some of said beacon medium access subslots as beacon slots, setting other beacon medium access subslots as a contention access period, and positioning two of the beacon slots, separated by the contention access period, at both ends of the beacon medium access slot; and
    broadcasting, by said beaconing device, during said beacon medium access slot, a beacon frame to other devices in a wireless range of said beaconing device using at least one of said selected beacon slots,
    wherein, in said broadcasting, said at least one beacon slot for broadcasting said beacon frame is selected randomly, per superframe, from said selected beacon slots.

2. The method according to claim 1, wherein said beacon medium access slot is designated randomly.

3. The method according to claim 1, wherein one or more of said slots is used for at least contention-based traffic between the devices in the wireless range of said beaconing device and is used by one or more of said devices to contend for said medium access time to be used by said one or more of said devices for sending data packets.

4. The method according to claim 1, wherein one or more of said slots is used for at least contention-based traffic between the devices in the wireless range of said beaconing device and is used by one or more beaconing devices to contend for said medium access time to be used by said beaconing devices for sending control packets.

5. The method according to claim 4, wherein contention for the medium access time for the control packets has a higher priority than contention for the medium access time for sending data packets.

6. The method according to claim 1, wherein slots not designated as beacon medium access slots are available to be reserved for contention-free data traffic between devices in said wireless network.

7. The method according to claim 1, wherein beaconing devices within said wireless network broadcast during their respective beacon frames information identifying which slots have been designated as beacon medium access slots for the beaconing devices.

8. The method according to claim 7, wherein the beaconing devices within said wireless network further broadcast during their respective beacon frames information identifying which slots have been reserved for contention-free traffic between devices in said wireless network.

9. The method according to claim 1, further comprising:
    identifying, by a receiving device, that two or more beaconing devices designated a same slot as its beacon medium access slot;
    announcing a collision by said receiving device;

designating, by each of said two or more beaconing devices which designated the same slot as its beacon medium access slot, a different slot as its beacon medium access slot; and announcing, by each of said two or more beaconing devices, the different slot designated by that beaconing device as its beacon medium access slot.

10. The method according to claim 1, further comprising:

identifying, by a plurality of beaconing devices, that two or more beaconing devices designated a same slot as its beacon medium access slot;

designating, by each of said two or more beaconing devices which designated the same slot as its beacon medium access slot, a different slot as its beacon medium access slot; and announcing, by each of said two or more beaconing devices, the different slot designated by that beaconing device as its beacon medium access slot.

11. The method according to claim 9, wherein said identifying includes receiving beacon frames in said same slot.

12. The method according to claim 3, wherein the contention for the medium access time for use for data packet transmission comprises:

sending, by a requesting device, a reservation request to one or more beaconing devices, said reservation request identifying one or more unused slots;

sending a response to said reservation request by said one or more beaconing devices;

collecting said one or more responses by said requesting device;

determining whether all of said one or more responses indicate acceptance of said reservation request;

announcing, by said requesting device, whether all of said one or more responses indicate acceptance of said reservation request; and if said announcing indicates that all of said one or more responses indicate acceptance, then announcing, by each beaconing device, the slots reserved by said requesting device for the data packet transmission.

13. The method according to claim 12, further comprising:

optionally sending an objection to said reservation request by one or more beaconing devices other than said one or more beaconing devices to which said reservation request was sent; and collecting any of said objections by said requesting device;

wherein said determining comprises determining whether all of said one or more responses indicate acceptance of said reservation request and whether any objections have been collected.

14. A wireless network including a plurality of devices, wherein access in said wireless network is controlled according to the method according to claim 1.

15. The method according to claim 1, wherein said broadcasting further comprises:

randomly selecting next beacon slots for broadcasting in a next superframe for every superframe, and broadcasting said randomly selected next beacon slots in a current superframe.

* * * * *